United States Patent [19]

Moreau

[11] 3,981,372

[45] Sept. 21, 1976

[54] MOTORIZED SNOW VEHICLE STAND

[76] Inventor: Lorenzo Moreau, 2275 Highway 69N, Box 331, Site 10, RR 2, Val Caron, Ontario, Canada

[22] Filed: Mar. 31, 1975

[21] Appl. No.: 563,674

[52] U.S. Cl. ............................. 180/5 R; 280/302
[51] Int. Cl.² ......................................... B62D 55/08
[58] Field of Search ............ 180/5 R; 292/114, 128; 254/86 R, 86 H; 280/301, 302

[56] References Cited
UNITED STATES PATENTS

| 709,588 | 9/1902 | Troschke | 280/302 |
|---|---|---|---|
| 1,358,123 | 11/1920 | Stewart | 292/114 |
| 3,570,616 | 3/1971 | Tominaga | 180/5 R |

OTHER PUBLICATIONS

"1968 – The Big Year for Snowmobiles" by Daniel C. Fales, Popular Mechanics, Oct., 1967, pp. 139–141.

Primary Examiner—M. H. Wood, Jr.
Assistant Examiner—John A. Carroll

[57] ABSTRACT

A motorized snow vehicle stand, for supporting the rear of the vehicle in a raised parking position so that the endless drive track is elevated above the ground, including a bail carried on a transverse horizontal pivot bar extended across the rear of the vehicle and rotatable through an arc of more than 180° from a raised or upright inoperate position where it is normally held against the rear of the vehicle by a manually releasable hook to a fully operative vehicle supporting position in engagement with the ground under the raised rear end of the vehicle where it is disposed in inclined position forward of dead center. The pivot bar is mounted on the vehicle in releasable nonrotatable relation and a spring is biased between the pivot bar and the bail, with provision for releasing and turning the bar to vary the spring tension. On release of the holding hook, the bail swings in two stages under action of the spring, namely through a first arc of less than 180° to engage the ground behind the vehicle and subsequently through a further arc when the vehicle is lifted allowing the bail to swing under the vehicle into an inclined position beyond or forward of dead center.

3 Claims, 5 Drawing Figures

U.S. Patent  Sept. 21, 1976  3,981,372
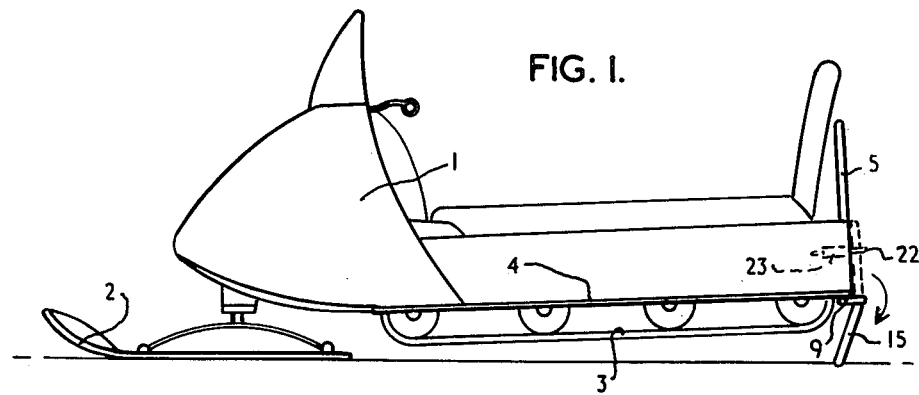
FIG. 1.
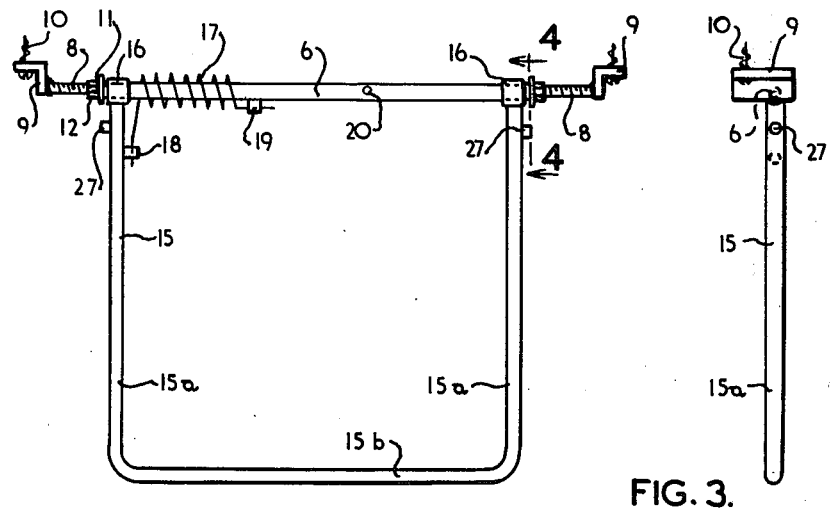
FIG. 2.
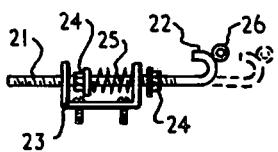
FIG. 5.
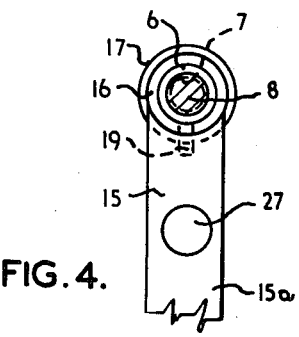
FIG. 3.
FIG. 4.

MOTORIZED SNOW VEHICLE STAND

The present invention relates to a motorized snow vehicle stand for supporting the rear of the vehicle in raised position when not in use with the endless rubberized drive belt elevated above the ground.

BACKGROUND OF THE INVENTION

Snow conditions vary greatly, depending on so many factors such as elevation, temperature, wind and sun. Furthermore the heat generated from running the motor, from sun reflection and from the weight of the machine all affect the snow in the immediate vicinity of and underneath a parked vehicle with the result that it is not unusual to find the endless drive belt or track and related parts of vehicle that was parked even on dry snow has settled into soft slush and frozen in when it is later desired to drive away. Ice fishermen are known to carry wooden packing cases to insert under the rear end of their parked vehicles but find it both difficult and dangerous for one man alone to try to lift the rear of his snowmobile and simultaneously work his makeshift stand into place. Such a stand may in turn be frozen in and not deemed worth retrieving and so left to pollute the area.

SUMMARY

Accordingly, it is an object of this invention to provide a motorized snow vehicle stand for supporting the rear of the vehicle in raised position that is instantly available for use and readily useable by the operator alone.

A further object of the invention is to provide a motorized snow vehicle stand that is normally held in raised inoperative position against the rear of the vehicle and is swingable under spring action through an arc of more than 180° into fully operative position.

A further object of the invention is the provision of a stand for a motorized snow vehicle that swings into operative position under spring influence, affording the vehicle's operator the undivided use of both arms to easily and safely lift the rear of the vehicle as the spring-urged stand moves further in final inclined resting position under the vehicle and beyond dead center.

A still further object of the invention is the provision of a snowmobile stand of the nature and for the purpose described including a pivot bar attachable in horizontal position across the rear of the snowmobile on which a bail-like U-shaped stand is rotatably mounted with a coil spring biased between the bar and stand, in which the bar is normally but releasably held in nonrotatable relation.

A still further object of the invention is the provision of a snowmobile stand characterized by structural simplicity, durability, and low cost of production whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

BREIF DESCRIPTION OF THE DRAWINGS

The invention will be best understood and can be more clearly described when reference is had to the drawings forming a part of this disclosure wherein like characters indicate like parts throughout the several views.

In the drawings:

FIG. 1 is a side view of a conventional snowmobile with the rear end resting on the stand to support the endless drive track in elevated position;

FIG. 2 is an enlarged elevation of the stand as seen in lowered position from the rear of the vehicle;

FIG. 3 is an end elevation thereof;

FIG. 4 is a further enlarged sectional detail, taken on line 4—4 of FIG. 3; and

FIG. 5 is an enlarged plan view of a hooked keeper for releasably holding the stand in raised inoperative position.

DETAILED DESCRIPTION OF THE ILLUSTRATED EMBODIMENT OF THE INVENTION

The snow vehicle seen in FIG. 1 represents a common type of snowmobile generally characterized by a low elongated body 1 supported at the front by a steerable ski or pair of skis 2 and propelled by a motor driven rubberized belt or endless track 3 underlying the body 1 aft of the skis 2. The drive track mechanism is disposed between the walls of an inverted channel or tunnel-like structure of the body 1 open to the rear and serves to carry the vehicle side frame members 4. At the rear of the body the frame rises as a flat vertical transom 5.

A pivot bar 6 is attached in transverse horizontal position across the rear of the vehicle; the length of the bar being less than the transverse distance between the vehicle's side frame members 4. An interiorly threaded axial bore 7 extends in from each end of the bar and each receives the inner end of a bolt 8 that carries an angle bracket 9 welded on its outer end. By screwing the bolts 8 the required distance into the threaded ends of the bar 6, the spread of the brackets 9 is adjusted to the width of the vehicle frame. Such spaced brackets are secured as by self-tapping screws 10 to the frame members 4. Each bolt 8 carries a freely sliding washer 11 engageable against the adjacent end of the rod 6 and a jamb nut 12 between its respective bracket 9 and washer 11 by which the latter is tightened against the end of the bar 6 to prevent relative rotation of the bar and the fixedly attached frame-engaging brackets 9.

The part by which the rear of the vehicle may be supported in raised position when parked is a U-shaped bail 15 shown here as having a spaced pair of parallel arms 15a connected by a cross reach 15b. Each arm has a sleeve 16 on its free end to accommodate the transverse pivot bar 6 in swinging relation, such bail arm sleeves being axially aligned and of a spread to lie within the ends of the bar being thereon captured by the washers 11.

A spring 17 is coiled around the bar 6 for biasing the swinging bail 15 against the fixed pivot bar 6, the ends of the spring being anchored to the bail and bar respectively as by the simple attaching expedient of a radial cap screw 18 threaded into the inside of one arm 15 of bail 6 near its sleeved free end and a similar radially extending cap screw 19 threaded into said bar, each of said cap screws having a transverse bore through the radially projecting part of its outer end. The tension on said spring may be adjusted by rotating the pivot bar 6 relative to the bail 15 on release of the bar holding means, for which purpose the bar is provided with a transverse bore 20 for the reception of an appropriate removable bar turning pin, not shown.

Normally carried in a raised inoperative position against the rear of the vehicle, the spring-urged swinging bail 15 is releasably held by a horizontally disposed bolt 21 with a bail-engaging hook 22 on its rear end carried by a vehicle-mounted U bracket 23 in rotatable and longitudinally sliding relation. The bolt 21 is threaded and carries nuts 24 between the hooked end of the bolt and the bracket and between the arms of the U bracket respectively to limit its sliding movement and also a coil spring 25 compressed on the bolt between the nut within the bracket arms and the rear arm of the bracket acting to retract the bolt when extended toward its hooked end, such hooked end 22 being provided with a manually engageable pull ring 26 on its outer side.

When the hooked bolt 21 is pulled rearwardly and turned, the spring-urged bail 15 is released and swings downwardly through an arc of less than 180 degrees to initially contact the ground behind the vehicle and in a position where it declines at an angle to the vertical. Because of the spring action on the bail, the operator is afforded the unrestricted use of both arms to lift the rear of the vehicle frame whereupon the bail swings through a further arc to a total rotative movement of more than 180 degrees to an inclined position under the vehicle ahead of or beyond dead center where it may be arrested at the limit of its swing as by bosses 27 extending laterally from the arms 15a of the bail that engage on such fixed parts of the vehicle as its coil cross springs (not shown).

When it is desired to resume use of a vehicle after it has been parked in elevated position on the stand, the operator standing at the rear and using both arms lifts lightly on the frame while pushing forwardly on the vehicle thus returning the drive track to the ground and causing the stand to swing back beyond dead center to decline at an angle to the rear of the vehicle. It is only necessary then for the operator to grasp the bail and swing it upwardly against the action of the spring into normal inoperative position against the back of the snowmobile and latch on the hooked bolt keeper.

From the foregoing description taken in connection with the accompanying drawings it will be seen that a motorized snow vehicle stand is provided that will fullfil all the necessary requirements of such a device, nevertheless it is to be understood that various changes in the size, shape and arrangement or parts may be made to the form of invention without departing from the spirit of the invention or scope of the claims.

What is claimed is:

1. For a motorized snow vehicle, a stand comprising a pivot bar attachable in transverse horizontal position across the rear of a motorized snow vehicle; means securing said bar in nonrotatable relation; a U-shaped bail having a spaced pair of parallel arms with a sleeve on the free end of each arm of said bail rotatably mounted on said bar; means normally holding said bail in raised inoperative position against the rear of the vehicle; and a spring biased between said nonrotatable bar and said bail acting to swing said bail downwardly into operative ground-engaging position beneath the vehicle, said bar having a threaded bore in each end, a bolt threaded in each said bore with a vehicle mounting bracket secured on the outer end of each said bolt, whereby the spread of the brackets is adjustable to the width of the vehicle frame and wherein each said bolt loosely carries a washer engageable with the near end of said bar and a jamb nut threaded on said bolt between said washer and said mounting bracket for tightening said washer against the end of the bar thereby capturing the bail arm sleeves on the bar and securing the bar against turning relative to said mounting brackets.

2. The vehicle stand according to claim 1, wherein said bar has a radially extending cap screw threaded therein and said U-shaped bail has a radially extending cap screw threaded into the inside of one arm thereof near its sleeved free end, each of said cap screws having a transverse aperture through its outer end, the opposite ends of said spring being captured in the apertures of said respective screws, and said bar having a transverse bore for the reception of a removable pin for turning said bar to vary the tension of said spring on release of said bar securing means.

3. The vehicle stand according to claim 1, wherein said bail is rotatable on said bar through an arc of more than 180° from raised inoperative position against the rear of the vehicle to fully operative vehicle supporting position in engagement with the ground under the raised rear end of a vehicle where the said stand is disposed at an inclined position beyond dead center, such rotation of the bail occurring on the manual release of said bail holding means, under the action of said spring in two movements namely, a first rotation of less than 180° to initial ground contacting position where it declines at an angle to the vertical and a subsequent rotative movement through a further arc for a total rotation of more than 180° when the rear end of the vehicle is lifted allowing the bail to swing under the vehicle into an inclined position beyond dead center, and means for arresting the bail in such fully operative position against further rotation by said spring.

* * * * *